(12) United States Patent
Stahlke et al.

(10) Patent No.: US 6,730,386 B1
(45) Date of Patent: May 4, 2004

(54) ENERGY ABSORBER FOR ABSORBING IMPACT ENERGY

(75) Inventors: Kurt-Rainer Stahlke, Kürten (DE); Roland Brambrink, Ratingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/129,019

(22) PCT Filed: Oct. 20, 2000

(86) PCT No.: PCT/EP00/10332

§ 371 (c)(1),
(2), (4) Date: Apr. 29, 2002

(87) PCT Pub. No.: WO01/33100

PCT Pub. Date: May 10, 2001

(30) Foreign Application Priority Data

Nov. 2, 1999 (DE) .......................................... 199 52 570

(51) Int. Cl.$^7$ ................................................. B32B 3/12
(52) U.S. Cl. .................. 428/118; 428/73; 428/174; 428/178; 428/188; 428/219; 428/220; 428/412; 428/304.4; 52/783.1; 52/793.1; 52/794.1
(58) Field of Search ................................. 428/116, 118, 428/73, 174, 178, 188, 219, 220, 412, 304.4; 52/783.1, 793.1, 794.1

(56) References Cited

U.S. PATENT DOCUMENTS

| | | | |
|---|---|---|---|
| 3,790,654 A | 2/1974 | Bagley | 264/177 |
| 4,666,130 A | 5/1987 | Denman et al. | 256/13.1 |
| 5,486,400 A | 1/1996 | Fishel | 428/116 |
| 5,683,782 A | 11/1997 | Duchêne | 428/116 |
| 5,720,510 A | 2/1998 | Daniel et al. | 296/188 |
| 5,746,419 A | 5/1998 | McFadden et al. | 267/140 |
| 6,413,613 B1 * | 7/2002 | Byma | |

FOREIGN PATENT DOCUMENTS

| | | |
|---|---|---|
| EP | 0 762 011 | 3/1997 |
| EP | 0 887 573 | 12/1998 |
| FR | 2334888 | 7/1977 |
| FR | 2763547 | 11/1998 |
| GB | 1006931 | 10/1965 |
| WO | 99/00236 | 1/1999 |

* cited by examiner

Primary Examiner—Deborah Jones
Assistant Examiner—Wendy Boss
(74) Attorney, Agent, or Firm—Joseph C. Gil; James R. Franks; Aron Preis

(57) ABSTRACT

An extruded polycarbonate article suitable as an energy absorber is disclosed. The article includes a plurality of honeycomb chambers that are aligned substantially in the same direction, extend in the direction of the extrusion and are disposed adjacent to one another. A method of using the article entails aligning the honeycomb chambers in a direction parallel to the direction of the impact energy.

19 Claims, 2 Drawing Sheets

ENERGY ABSORBER FOR ABSORBING IMPACT ENERGY

Figure 1:
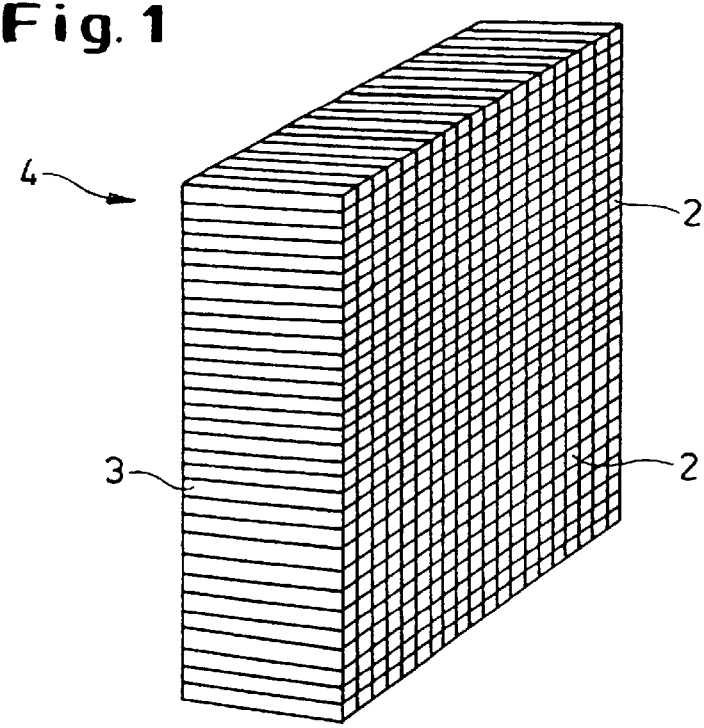

The invention relates to an energy-absorber for absorbing impact energy.

Within the field of the development of motor vehicles, but also in other fields, passive safety is increasingly becoming an object of central research. In this connection, structures and materials with high energy-absorbing power are of great interest above all. In the automobile industry, for example, use is made of foams consisting of polyurethane (PU) or elastomer-modified polypropylene (EPP). These materials are distinguished by almost ideal behaviour, whereby, after an initially steep increase in force, a horizontal plateau with constant force arises during the absorption of energy which continues to progress temporally. The work that is absorbed in the process is defined as the area under the force-displacement curve; this area should be as large as possible. Various foams that are known from the state of the art approach this ideal quite closely with regard to their energy-absorbing power.

With these energy-absorbers, however, the problem arises that the accelerations which occur are so high that limiting values are exceeded which are not permitted to be exceeded for the impact of a person in the case of road traffic accidents or other accidents. For, in the event of a head impact, an acceleration value of 80 g is only permitted to be exceeded for a time-interval of less than 3 ms.

The plastic deformation of side-member structures may be cited as a further example of energy absorption in the case of a motor vehicle. In this case the metal of the side-member structures is compressed until, under a defined load, the structure collapses, that is to say it buckles, and telescopes inwards. In this case the metal is plastically deformed, resulting in a high absorption of energy.

Although the materials that have been used hitherto for the energy-absorbers result in a high energy-absorbing capacity, the weight of the energy-absorber is not inconsiderable, even when use is made of a light metal such as aluminium. Since weight-reduction plays an important role in the motor industry in particular, the search for extremely lightweight materials with high energy-absorbing power is continuing intensively.

A further reduction in weight is also achieved in the state of the art by the energy-absorbers not taking the form of solid materials but rather by cavity structures—such as a sandwich structure, for example—being produced that exhibits a particularly high energy-absorbing power in a preferential direction. For this purpose the cavity structure comprises a plurality of honeycomb chambers that are aligned substantially in the same direction and disposed adjacent to one another. But also in this case it is not possible to remain below a certain weight when use is made of metals or light metals.

The technical problem underlying the invention is therefore to specify an energy-absorber that exhibits both a very low weight and a high energy-absorbing power.

In accordance with the invention it has been recognised that the moulding is produced from extruded polycarbonate, with the honeycomb chambers extending in the direction of extrusion. In comparison with light metals, polycarbonate is a very lightweight material which is inherently very resilient. In addition, polycarbonate is highly resistant to impact, so that in the event of an abrupt application of force the material does not shatter but deforms elastically and, where appropriate, melts. Consequently the action, according to the invention, as an energy-absorbing material is guaranteed by the polycarbonate as such, with a very low weight of the energy-absorber resulting at the same time.

For production of the moulding, polycarbonate is extruded in such a way that, depending on the extrusion tool that is used, a plurality of honeycomb chambers disposed side by side are formed in the direction of extrusion, each two adjacently disposed honeycomb chambers being separated from one another by a respective common wall. Depending on the size and girth of the moulding, in the course of production several extruded polycarbonate layers with honeycomb chambers are produced which, after extrusion, are connected to one another by material closure. From a block which is consequently formed it is possible for individual sheets to be separated—with the aid of a hot wire, for example—which comprise a corresponding plurality of honeycomb chambers, the length of which corresponds to the thickness of the sheet that has been separated from the block.

The honeycomb chambers have a polygonal cross-section, which is preferably either quadrangular or hexagonal. In preferred manner the external dimensions of the honeycomb chambers lie within the range from 1 to 6 mm, it also being possible for these range limits to be transgressed in individual cases. By reason of the small magnitude of the dimensions of the honeycomb chambers the latter may also be designated as capillaries.

Moreover, the honeycomb chambers have a wall thickness within the range from 50 $\mu$m to 400 $\mu$m. This results in a very low ratio of the wall thickness to the dimension of the honeycomb chamber, which serves as the basis for a further reduction in weight.

The density of the moulding consequently lies, for example, within the range from 30 kg/m$^3$ to 50 kg/m$^3$, which represents a clearly lower value in comparison with energy-absorbers made of light metal.

As has been described above, sheets are cut off from a block which is composed, for example, of several extruded honeycomb-chamber layers, so that the honeycomb chambers pertaining to a sheet have substantially a predetermined length. A moulding of this type may then also be designated as a honeycomb sheet.

Consequently a planar configuration of the moulding of the energy-absorber is also possible.

Besides a flat design of the moulding, the latter may also have a curved shape, in order also to line curved surfaces with the energy-absorber. The moulding is consequently capable of being adapted to a surface, in which connection small radii can also be established, depending on the thickness of the moulding. In every case the honeycomb chambers extend substantially radially in relation to the respective curvature of the surface to be lined. Consequently, impact protection can be guaranteed effectively also in the case of curved inner surfaces.

In another configuration of the moulding at least one of the end faces which include the openings of the honeycomb chambers is provided with a substantially closed layer. Said closed layer is preferably connected to the respective end face by material closure and consequently, besides serving for shaping the moulding in relation to a flat or curved surface, also serves to stabilise the moulding. This layer may also take the form of a sheet or a film and may likewise be produced from polycarbonate or a different synthetic material. It is equally possible for the layer to take the form of a fabric. The layer should preferably be of resilient construction like the moulding, in order not to splinter in the event of an impulse. Furthermore, the layer serves to distribute the application of force onto a relatively large number of honeycomb chambers, since the impact is absorbed not only by the honeycomb chambers that are actually struck without a layer but, by virtue of the covering layer, also by honeycomb chambers disposed in the field surrounding the actual point of impact.

In particularly preferred manner the moulding is arranged on the inner surface of a vehicle, in particular of a motor vehicle, as a result of which the inner surfaces of the vehicle, which as a rule are rigid, are protected. Consequently, in the event of the impact of an occupant the head in particular is reliably protected. By way of inner surfaces in this connection, the pillars that are necessary for the roof construction, the dashboard, and also the inside of the roof enter into consideration.

Furthermore, the moulding previously described may form at least a part of a bumper of a vehicle. By virtue of the extremely lightweight construction, considerable weight-savings in the vehicle can consequently be achieved.

By way of vehicles, both motor vehicles, in particular motor cars, as well as rail vehicles and aircraft enter into consideration. Since a low inflammability of the material is also necessary in addition to the energy-absorbing power, when use is made of polycarbonate the additional advantage arises that polycarbonate is a self-extinguishing material and is accordingly rated in a fire class with low burning capacity. The inflammability of polycarbonate is less than that of other materials employed as energy-absorbers, particularly in the interior of the vehicle, such as polymethyl methacrylate or polystyrene for example.

In another preferred application the moulding may be arranged on the wall of a building. Consequently, in addition to its use in automobile engineering the energy-absorber can also be employed in sports arenas or kindergartens, for example, in order to realise impact protection for people who accidentally strike a wall while engaging in sport. In this connection the use of the energy-absorber for the purpose of damping the floor of a sports venue or a sports hall is also conceivable.

On account of its translucence, polycarbonate is used pre-eminently as the material for structural components that have to exhibit particular optical properties. For instance, polycarbonate is employed for screens and windows that are intended to be translucent. On the other hand, this requirement does not exist in the case of energy-absorbers, so that use can also be made, in advantageous manner, of polycarbonate reject material which, by reason of fabrication defects, is not transparent but is at least partially discoloured and exhibits black or coloured pigments. Consequently, reject material that cannot be used for the production of transparent mouldings can be employed for the production of energy-absorbers.

Figure 2:
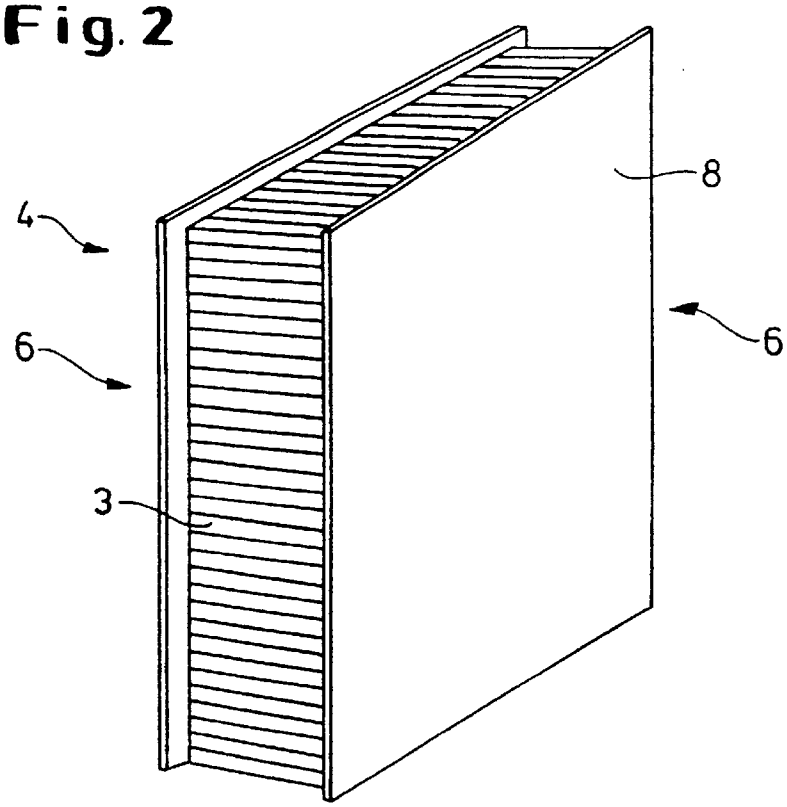
Figure 3:
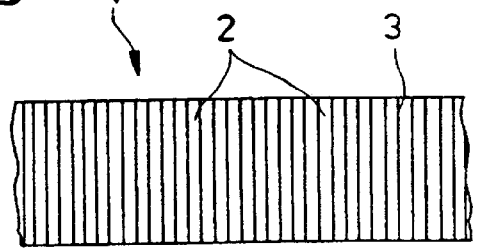
Figure 4:
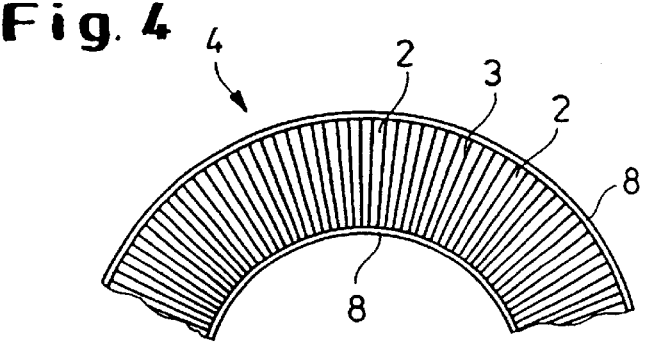
Figure 5:
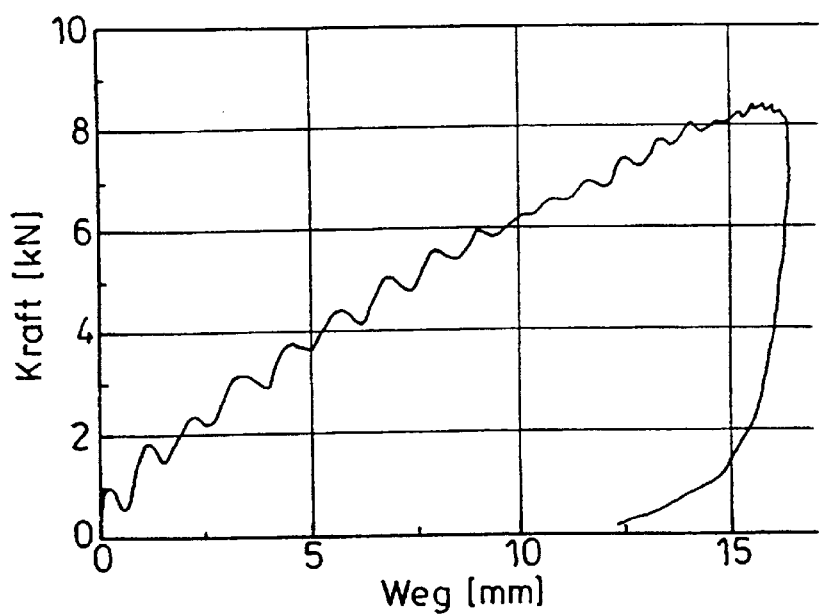

The invention is elucidated in more detail in the following on the basis of embodiments, reference being made to the attached drawing. Shown in the drawing are:

FIG. 1 a first embodiment of an energy-absorber according to the invention in a perspective representation, FIG. 2 a second embodiment of an energy-absorber according to the invention in a perspective representation, FIG. 3 the energy-absorber represented in FIG. 1, in cross-section, FIG. 4 the energy-absorber represented in FIG. 2, in cross-section but with a curved contour, and FIG. 5 a force-displacement diagram of a head-impact experiment.

FIG. 1 shows a first embodiment of an energy-absorber according to the invention with a moulding 4 comprising a plurality of honeycomb chambers 2. The honeycomb chambers 2 are aligned substantially in the same direction and are disposed adjacent to one another. Each two adjacently disposed honeycomb chambers 2 have a common wall 3, so that the honeycomb structure represented in FIG. 1 arises. According to the invention, the moulding 4 has been extruded from polycarbonate, with the honeycomb chambers 2 extending in the direction of extrusion.

In terms of production engineering it is not possible for arbitrarily many honeycomb chambers 2 to be extruded on top of one another, so that, for example, a plurality of layers with, for example, five rows of honeycomb chambers 2 situated above one another are produced by parallel extrusion. Subsequently the layers are connected to one another, in order to make possible the cross-section of the moulding 4 that is shown in FIG. 1. From the strand which is consequently formed, individual sheets 4 are cut off which then have the shape that is represented in FIG. 1. The openings of the individual honeycomb chambers 2 are quadrangular in the present embodiment, and the honeycomb chambers 2 extend over the entire width of the sheet 4 which is represented, that is to say, from right to left in FIG. 1. The high energy-absorbing power of the moulding 4 obtains, above all, in the longitudinal direction of the honeycomb chambers 2. Despite a very small wall thickness and a low overall density of the moulding, the high energy-absorbing power arises. At right angles to the longitudinal direction of the honeycomb chambers 2, on the other hand, the energy-absorber that is represented in FIG. 1 is only capable of absorbing energy to a slight extent. The honeycomb chambers 2 should therefore be arranged in each instance in such a way that they are aligned parallel to the direction of absorption of energy.

The honeycomb chambers 2 generally have a polygonal cross-section, which in the present case is quadrangular. The external dimensions of the honeycomb chambers 2 lie within the range from 1 mm to 6 mm, preferably from 2 mm to 5 mm and particularly preferably from 3.5 mm to 4.5 mm. The precise external dimensions are adjusted in each instance so as to conform to the special requirements of the energy-absorber.

Moreover, the honeycomb chambers 2 have a wall thickness within the range from 50 $\mu$m to 400 $\mu$m, preferably from 100 $\mu$m to 350 $\mu$m, particularly preferably from 150 $\mu$m to 300 $\mu$m. The wall thickness is adjusted as a function of the external dimensions of the honeycomb chambers 2, so that an optimum arises in terms of stability, energy-absorbing power and as low a weight as possible.

From the previously specified external dimensions and wall thicknesses of the honeycomb chambers 2 it follows that the moulding has a density within the range from 30 $kg/m^3$ to 50 $kg/m^3$, preferably from 35 $kg/m^3$ to 45 $kg/m^3$, particularly preferably 37 $kg/m^3$ to 43 $kg/m^3$. Despite these very low density values, the desired high absorption of energy is obtained by reason of the honeycomb structure and the resilience of the polycarbonate.

The shape and alignment of the honeycomb chambers 2 can also be discerned in FIG. 3, which represents in cross-section the energy-absorber that is represented in FIG. 1.

The moulding 4 that is represented in FIGS. 1 and 3 and that may also be designated as a honeycomb sheet, has a surface extending substantially in a plane. This moulding 4 is therefore suitable, in particular, for the lining of flat surfaces.

On the other hand, FIG. 4 shows a curved contour of the honeycomb sheet 4, with the honeycomb chambers 2 extending substantially radially in relation to the curvature. In this configuration the moulding 4 can also be used for the lining of curved surfaces, particularly in vehicles.

In FIG. 2 another embodiment of an energy-absorber according to the invention is represented, wherein the moulding 4 consisting of the honeycomb chambers 2 is provided with substantially closed layers 8 on the end faces 6 which include the openings of the honeycomb chambers 2. These layers 8 are connected to the respective end face 6 by material closure, the layer 8 taking the form of a film. In the present embodiment the layer 8 is produced from polycarbonate, that is to say from the same material as the moulding 4 itself. The layer 8 serves, on the one hand, to stabilise the shape of the moulding 4, that is to say, for example, the flat shape represented in FIG. 2 or the curved shape represented in FIG. 4. Depending on the thickness of the moulding 4, small radii can therefore also be obtained, so that appropriately curved surfaces, of the insides of motor vehicles for example, can be covered with the energy-absorber.

In addition, the layer 8 also serves to distribute the impact energy onto a larger number of honeycomb chambers than is the case without a layer 8. This has an influence on the accelerations arising in the event of impact, as is described in the following on the basis of a head-impact experiment.

In a head-impact experiment a spherical segment which, to some extent, reproduces the human head in shape and weight is dropped freely onto an energy-absorber from a certain height. When the spherical segment impacts, the reaction forces and accelerations arising are recorded as a function of the displacement within the energy-absorber. A corresponding force-displacement diagram is represented in FIG. 5.

The drop test was carried out with a mass m=4,533 g and a height of drop h=2 m, use being made of an energy-absorber with an undeformed overall height of 25 mm. As is evident from FIG. 5, the moulding of the energy-absorber was indented by about 17 mm, the increase in force being largely linear. After the spherical segment had been completely decelerated by the energy-absorber, the force dropped off rapidly (see the right-hand side of the measurement curve) whilst the displacement of the spherical segment was adjusted back to about 12.5 mm. This means that the moulding of the energy-absorber has been plastically deformed permanently. The reason for this is that an elastic deformation of the polycarbonate is possible up to a limiting value of the absorption of energy. Beyond the limiting value an increasing transformation of the kinetic energy into thermal energy then takes place, as a result of which, starting from the melting-temperature, the material of the honeycomb chambers is melted down and a permanent plastic deformation occurs. What is important here is that the material of the polycarbonate fuses and does not shatter, resulting in advantages in terms of safety in the case of the energy-absorber according to the invention.

The head-impact experiment described previously was carried out both with energy-absorbers according to FIG. 1 without covering layers and with energy-absorbers according to FIG. 2 with covering layers. In these tests it became evident that the layers have a stabilising influence on the overall structure of the moulding. In the case of the moulding that is coated on both sides, accelerations of about a=150 g arose, whereas the uncoated moulding only exhibited accelerations of about a=90 g. This fact is significant in particular for the reason that not only the absolute value of the absorbed energy but also the level of acceleration of the event is important for the energy-absorber. Thus in the case of impact of the head, for example, accelerations of more than a=80 g are permitted to occur only within a time-interval of less than 3 ms.

What is claimed is:

1. An energy-absorber for absorbing impact energy comprising,
   a moulding (4) comprising a plurality of honeycomb chambers (2), the honeycomb chambers (2),
      being aligned substantially in the same direction, being disposed adjacent to one another, having a polygonal cross-section, being open and extending over the entire width of said moulding, having external dimensions within the range from 1 mm to 6 mm, having a wall thickness within the range from 50 $\mu$m to 400 $\mu$m; and being uniform throughout said moulding,
   wherein the moulding (4) is produced by extruding polycarbonate such that,
   the honeycomb chambers (2) extend in the direction of extrusion, and each honeycomb chamber is separated from an adjacent honeycomb chamber by a common wall, and further wherein said moulding has a density within the range of 30 kg/m$^3$ to 50 kg/m$^3$.

2. The energy-absorber of claim 1 wherein the honeycomb chambers (2) are aligned parallel to the direction of absorption of energy.

3. The energy-absorber of claim 1 wherein the polygonal cross-section of said honeycomb chambers is selected from quadrangular cross-sections and hexagonal cross-sections.

4. The energy-absorber of claim 1 wherein the honeycomb chambers (2) have substantially a predetermined length.

5. The energy-absorber of claim 4 wherein the moulding (4) has the form of a honeycomb sheet.

6. The energy-absorber of claim 5 wherein the surfaces of the moulding (4) extend substantially in a plane.

7. The energy-absorber of claim 4 wherein the moulding (4) has a curved shape, with the honeycomb chambers (2) extending substantially radially in relation to the respective curvature.

8. The energy-absorber of claim 4 wherein the honeycomb chambers (2) of said honeycomb sheet have openings which define end faces (6), at least one of said end faces (6) being provided with a substantially closed layer (8).

9. The energy-absorber of claim 8 wherein said closed layer (8) is connected to at least one of said end faces (6) by means of material closure.

10. The energy-absorber of claim 8 wherein said closed layer (8) has the form of at least one of a sheet and a film.

11. The energy-absorber of claim 8 wherein said closed layer (8) is fabricated from polycarbonate.

12. The energy-absorber of claim 8 wherein said closed layer (8) is fabricated from a fabric.

13. The energy-absorber of claim 1 wherein the moulding (4) is arranged on an inner surface of a vehicle.

14. The energy-absorber of claim 13 wherein the moulding (4) forms at least a portion of a shock-absorber of a vehicle.

15. The energy-absorber of claim 1 wherein the moulding (4) is arranged on a wall of a building selected from a sports hall and a kindergarten.

16. The energy-absorber of claim 1 wherein the moulding (4) is produced at least partially from a discoloured polycarbonate.

17. An extruded polycarbonate article comprising a plurality of honeycomb chambers that are aligned substantially in the same direction and are disposed adjacent to one another, said honeycomb chambers:
   extending in the direction of extrusion; having a polygonal cross-sections;

being open and extending over the entire width of said article;

having external dimensions within the range from 1 mm to 6 mm;

having a wall thickness within the range from 50 µm to 400 µm; and being uniform throughout said article, wherein the polycarbonate article is produced by extruding polycarbonate such that, the honeycomb chambers extend in the direction of extrusion, and each honeycomb chamber is separated from an adjacent honeycomb chamber by a common wall, and further wherein said article has a density within the range of 30 kg/m$^3$ to 50 kg/m$^3$.

18. A method of using the article of claim 17, comprising absorbing impact energy, wherein the honeycomb chambers are aligned parallel to the direction of the impact energy.

19. The article of claim 17, wherein the cross-section of said chambers is selected from quadrangular-cross-sections and hexagonal cross-sections.

* * * * *